United States Patent [19]

Morita et al.

[11] 4,395,907

[45] Aug. 2, 1983

[54] AIR FLOW RATE MEASURING DEVICE

[75] Inventors: Kiyomi Morita; Tadahiko Otani; Yoshikazu Aochi, all of Katsuta; Takao Teranishi, Hitachi, all of Japan

[73] Assignee: Hitachi, Ltd., Tokyo, Japan

[21] Appl. No.: 211,900

[22] Filed: Dec. 1, 1980

[30] Foreign Application Priority Data

Nov. 29, 1979 [JP] Japan .................. 54-155350

[51] Int. Cl.³ .............................................. G01F 5/00
[52] U.S. Cl. ........................................ 73/202; 73/118
[58] Field of Search ................ 73/116, 118, 202, 204; 123/494

[56] References Cited

U.S. PATENT DOCUMENTS

| | | | |
|---|---|---|---|
| 790,888 | 5/1905 | Ferris | 73/202 |
| 1,010,400 | 11/1911 | Coleman | 73/202 |
| 3,559,482 | 2/1971 | Baker | 73/202 X |
| 4,142,407 | 3/1979 | Kuroiwa et al. | 73/118 |
| 4,264,961 | 4/1981 | Nishimura et al. | 73/204 X |
| 4,282,751 | 8/1981 | Brown | 73/202 |

FOREIGN PATENT DOCUMENTS 74070 11/1960 France .................. 73/202

*Primary Examiner*—Herbert Goldstein
*Attorney, Agent, or Firm*—Antonelli, Terry & Wands

[57] ABSTRACT

An air flow rate measuring device has a by-pass passage branched from a main air passage leading to an engine, and heat wires provided in the by-pass passage. The inlet of the by-pass passage is positioned at the upper end of a venturi tube disposed in the main air passage, shaped annularly, and opened to the main air passage so that the air at the inlet can be subjected to the dynamic pressure of the main air stream. The outlet of the by-pass passage also is annularly formed and opened normally to the main air stream in the main air passage. The flow rate of air sucked into the engine is measured by the heat wires subjected to air flow taken in the by-pass passage.

14 Claims, 3 Drawing Figures

4,395,907

AIR FLOW RATE MEASURING DEVICE

BACKGROUND OF THE INVENTION

This invention relates to an air flow rate measuring device which measures a flow rate of air taken into an internal combustion engine and more particularly to an air flow rate measuring device which is provided with a hot wire installed in the by-pass passage communicating with the main air passage.

In a conventional device the flow rate of air taken in is measured by installing a wire in a main air passage, supplying electric current to the wire to compensate for the amount of heat lost in the main air stream, and measuring the voltage drop across the wire caused by the current flowing through it. This kind of device, however, has the disadvantage that the wire is easily fouled with dust contained in the suction air. Furthermore, when the engine backfires, hot air from the engine will not only foul the wire but may damage it.

To overcome these drawbacks, it has been a practice to install the hot wire in the by-pass passage which communicates at both ends with the main air passage.

In FIG. 2 of commonly assigned co-pending U.S. patent application Ser. No. 28,889, a by-pass passage installed with a flow rate sensor, such as a wire, is provided to by-pass the venturi of the main air passage. An inlet of the by-pass passage is formed in the upper portion of the venturi. An annular outlet that is, the lower end of the by-pass passage opens into the main air passage through the venturi.

With this type of the intake air flow rate measurement device, the sensor or hot wire will not be damaged if the backfiring occurs because the hot air from the engine flows back through the main air passage not the by-pass passage. However, since the inlet of the by-pass passage is formed in a portion on the circumference of the venturi and opens upward, if there is not a cover covering the inlet, the dust may fall into the by-pass passage and adhere to the wire and the blast from the backfire may enter it through the inlet, fouling the wire. Although the degree to which the wire of this device will be fouled or damaged may be smaller than that for the type with the wire installed in the main air passage, it still cannot be protected completely from being fouled. If the wire is fouled, the constants of the material and shape of the wire (which is described later) will change, deteriorating the accuracy of the measurement of intake air flow rate.

The member disposed to cover over the inlet of the by-pass passage will alleviate the drawback to some extent, but may also reduce the flow rate of air taken into the by-pass to some extent, whereby the accuracy of the measurement of the intake flow rate may be reduced.

SUMMARY OF THE INVENTION

An object of the invention is to provide a device which can measure an intake air flow rate with high accuracy over the entire operating condition and which has long life.

Another object of the invention is to provide an air flow rate measuring device in which a relatively large flow rate of air can be taken into a by-pass passage with a sensor, and the amount of dust taken in the by-pass passage and the influence of backfiring on the sensor can be minimized.

The feature of the invention is that an inlet of a by-pass passage provided with a sensor means is formed annularly and opened to the main air stream flowing into an engine so that air at the inlet will be subjected to a dynamic pressure. Namely, part of the annular opening of the by-pass passage inlet is opened against the main air stream, whereby a relatively large amount of air can be taken in the by-pass passage without unduly extending the area of the inlet of the by-pass passage. Further, the inlet is shaped annular and along the inside circumference of the main air passage so that the air can be received approximately evenly from the circumference of the main air stream. Therefore, for example, no matter where the air inlet of an air cleaner is oriented, a change in the flow rate of the air taken in the by-pass passage can be minimized.

DESCRIPTION OF THE PREFERRED EMBODIMENT

An embodiment of an air flow rate measuring device according to the invention will be described hereinafter in detail referring to FIGS. 1 to 3.

Figure 1:
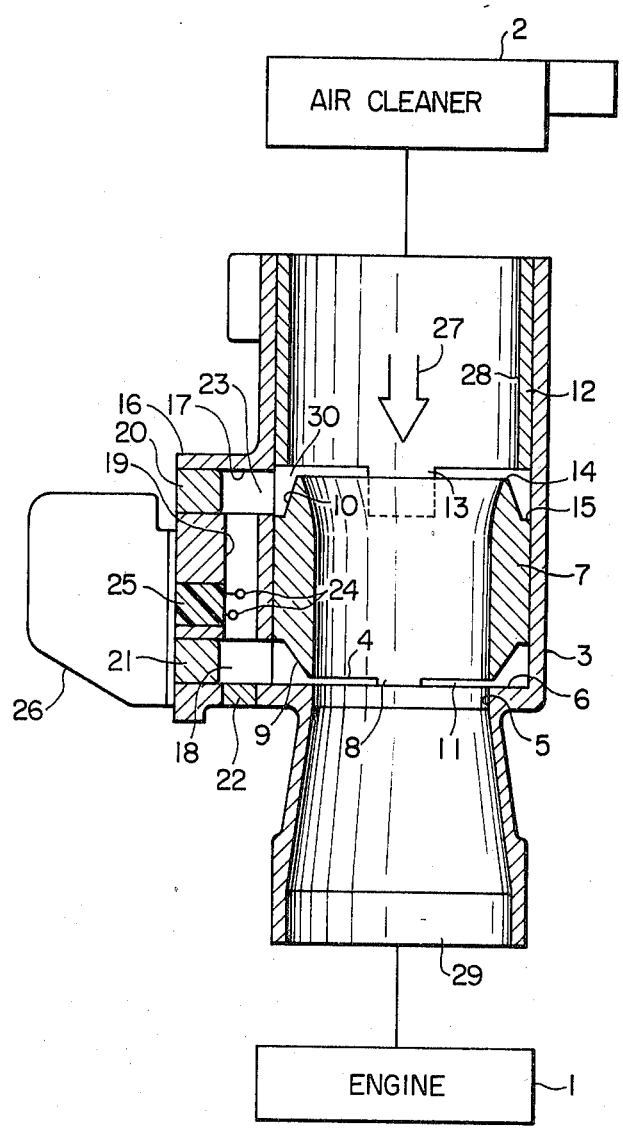
FIG. 1 is a sectional view of an air induction portion provided with an air flow rate measuring device according to an embodiment of the invention.

In FIG. 1, an internal combustion engine 1 is connected to an air cleaner 2 through a suction tube 3 to supply air to the engine. In a part of the suction tube 3, a throat portion 5 is provided for contracting an air stream in the main air passage 29. An inner shoulder 6 is defined by the throat portion 5 inside the suction tube 3. In the inside of the suction tube 3, a venturi tube 7 is inserted and rests on the shoulder 6 at a pair of the projections 8 formed at the lower end of the venturi tube 7 so that an annular gap or slit 11 will be defined between the end 4 and the shoulder 6. The venturi tube 7 is expanded gradually toward the upper end 4, and the outside is tapered at both end portions 9, 10. An inner straight cylinder 12 is inserted in the suction tube 3 and rests on the venturi tube 7 with a pair of projections 13 formed at the lower end being supported by the upper end portion 15 of the venturi tube 7, so that an annular gap 30 will be defined between the lower end of the cylinder 12 and the venturi tube 7. The top outside 14 of the venturi tube 7 is disposed radially spaced from the inside surface 28 of the inner cylinder 12 so that the annular gap 30 is against the direction of main air stream 27 caused by operation of the engine 1.

In a part of the side wall of the suction tube 3 corresponding to the position of the venturi tube 7, a boss 16 is formed. In the boss 16, a pair of horizontal holes 17, 18 are made to be positioned at the venturi tube end portions 10, 9, respectively, and a vertical hole 19 is formed between the horizontal holes 17 and 18. The holes 17, 18 and 19 are closed by an insert 20, 21, 22, respectively so that a by-pass passage 23 is formed running from the by-pass inlet formed by the annular gap 30 to the by-pass outlet formed by the annular gap 11 through the holes 17, 18 and 19. In the by-pass passage 23, a pair of hot wires 24 operating as a sensor are disposed, being held by an insulator 25 which is rigidly inserted in a hole made in the boss 16. The wires 24 are electrically connected to a drive circuit 26 provided at the side of the suction tube 3.

With the above construction, as the air passes through the main air passage 29, a negative pressure develops at the outlet 11, causing the air to flow through the by-pass passage 23. The flow rate of air flowing through the by-pass passage 23 is proportional to that of the air passing through the main air passage 29. In the by-pass passage 23 there are installed the pair of wires 24 which are heated to a certain temperature by current supplied from the drive circuit 26.

The wires 24 are heated by the drive circuit 26 to keep the temperature constant. Assuming I to be the current flowing through the wires 24, the following equation is given:

$$I^2 = K(C_1 + C_2 \sqrt{Q_a}) \propto V^2,$$

wherein K, $C_1$ and $C_2$ are constants that depend on the material and shape of the wires 24; $Q_a$ is a flow rate of air flowing in the by-pass passage 23; and V is the voltage across the wire terminals or output voltage of the heat wire type flow sensor. Therefore, by detecting the voltage V, the flow rate of air flowing in the by-pass passage can be found. Thus, the total amount of air taken into the engine 1 can be determined if the by-pass ratio, the ratio between the flow rates of air passing through a main air passage defined by the inner surface of the venturi tube and the by-pass passage 23 is known, which principle has been already known.

With this construction of the air flow rate measuring device, the annular slit or gap 30 opens to the main air passage 29 at an angle and the upper end 14 of the venturi tube 7 is slightly projected into the main passage 29, so that the air disposed at the gap 30 will subjected to the dynamic pressure of the air flowing through the main passage 29. This increases the by-pass ratio. In other words, the air velocity through the by-pass passage 23 is relatively high even when the engine is running at low speeds, which in turn improves the accuracy of measurement. Furthermore, since the lower bore of the venturi tube 7 or the throat portion 5 is relatively large and the outlet slit or gap 11 of the by-pass passage 19 is formed at the lower end of the venturi tube 7, the negative pressure developed at the outlet 11 will not become too great during the high speed operation of the engine 1. This keeps the accuracy or resolving power of the heat wires 24 from being deteriorated due to excessively high speed of air flow through the by-pass passage 19. Therefore, this air flow rate measuring device enables highly accurate measurement of the intake air volume over the entire operating range of the engine.

If backfiring occurs and hot air flows back through the main air passage 29, the dynamic pressure of the reverse air flow will not be applied to the outlet 11 because the outlet 11 opens normal to the main passage at the end of the relatively straight, throttled portion of the venturi tube 7. Although the annular slit 30 opens to the main passage 29, the small opening area of the slit 30 prevents dust from entering the by-pass passage 23. If it is desired to form the inlet and outlet as a complete annular slit without interruption over entire circumference, the inner cylinder 12 and the venturi tube 7 may be secured to the suction tube 3 by screws rather than by providing projections 13, 8 to them.

Figure 2:
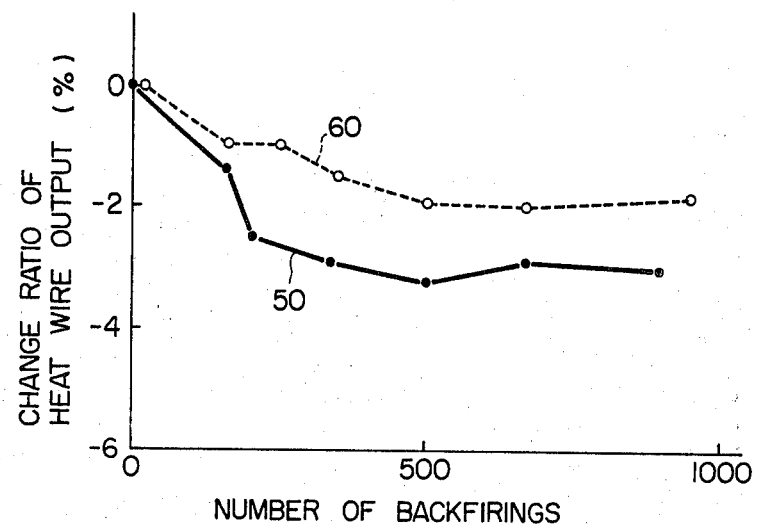
FIG. 2 is a diagram showing the relation between the hot wire output and the number of backfirings.

FIG. 2 shows the relation between the number of backfirings and the rate of change of heat wire output, with the abscissa representing the number of backfirings and the ordinate the rate of change of the heat wire output in percentage. The solid line 50 connecting the black dots represents the case where the inlet of a by-pass passage is not an annular slit, but a round hole and formed at a part of the upper end of a venturi tube so as to be opened against the main air flow. The dashed line 60 connecting the white dots is for the case of the abovementioned embodiment of the invention.

As can be seen in the diagram, the device of this invention has small fluctuation in the wire output. For example, the rate of change is only about 2% when backfiring has occurred more than 500 times. On the other hand, with the device with the round by-pass passage inlet, the rate of change of output reaches approximately 3.2% with about 200 backfirings. From this experiment it can safely be said that the device of this invention is little affected by the backfiring and can therefore be used reliably for a long period.

Figure 3:
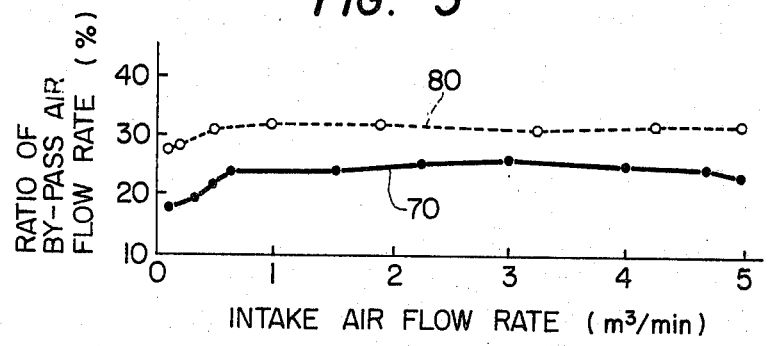
FIG. 3 is a diagram showing the relation between the intake air flow rate and the by-pass ratio.

FIG. 3 shows the relation between the total intake air flow rate and the by-pass ratio with the abscissa repesenting the total intake air flow rate in m³/min and the ordinate showing the ratio (%) of the by-pass air flow rate to the total intake air flow rate. The solid line 70 connecting the black dots represents the case where a device has a by-pass passage inlet which is an annular slit formed at the upper end of a venturi tube so as to open normally to the main air flow. In such a device, it is found that, in the range of the total intake air flow rate less than 1 m³/min, which corresponds to the idling, and greater than 4 m³/min, which corresponds to 4000 rpm (in the case of 2000 cc engine), the by-pass ratio falls down rapidly. This is because the by-pass passage is only subjected to a static pressure through the annular slit.

On the other hand, with the device of this invention, it can be seen from the dashed line 80 that the fluctuation of the by-pass ratio is relatively small over the entire range of the total intake air flow rate and of the engine speed. Therefore, by measuring the by-pass air flow rate, the entire intake air flow rate can be determined with high accuracy. This in turn improves the accuracy with which to control the air-fuel mixture to be supplied to the internal combustion engine.

Since the intake air flow rate measuring device of this invention is so constructed that the inlet of the by-pass passage is subjected to the dyanmic pressure and the outlet to the static pressure, the fluctuation of the by-pass ratio is small over the entire range of intake air flow rate volume. This greatly contributes to improving the accuracy of the measurement. Furthermore, because the by-pass passage of this invention is little affected by the blast of backfiring, the output fluctuation of the hot wire is very small and therefore its high sensitivity can be maintained for a long period of use.

What is claimed is:

1. An air flow rate measuring device comprising
   main air passage means for introducing therethrough air into and internal combustion engine;
   venturi means provided in said main air passage means for contracting an air stream to make the pressure at a portion of said main air passage means relatively lower;
   by-pass passage means for by-passing a portion of said air stream of said main air passage means;

outlet means of said by-pass passage means formed at the relatively lower pressure portion of said main air passage means so that the air at said outlet means is subjected to static venturi pressure due to the air stream flowing in said main air passsage means;

inlet means of said by-pass passage means disposed upstream of said outlet means and formed as an annular slit along the inner circumference of said main air passage means, a downstream side of a slit defining surface of said inlet means projecting slightly into said main air passage means such that the inlet means is opened to said main air passage means in radial and axial directions so that the air at said inlet means is subjected to the dynamic pressure due to the air stream flowing in said main air passage means; and sensor means disposed in said by-pass passage means for measuring the flow rate of air flowing in said by-pass passage means.

2. The device as defined in claim 1, wherein said venturi means comprise a venturi tube, and said inlet means is defined at the end of said venturi tube disposed upstream of said outlet means.

3. An air flow rate measuring device comprising
main air passage means for introducing therethrough air into an internal combustion engine;
venturi means provided in said main air passage means for contracting an air stream to make the pressure at a portion of said main air passage means relatively lower;
by-pass passage means for by-passing a portion of said main air passage means;
outlet means of said by-pass passage means formed at the relatively lower pressure portion of said main air passage means;
inlet means of said by-pass passage means disposed upstream of said outlet means and formed angularly along the inner circumference of said main air passage means, said inlet means projecting slightly into said main air passage means and being open in radial and axial directions to said main air passage means so that the air at said inlet means is subjected to the dynamic pressure due to the air stream flowing in said main air passage means; and
sensor means disposed in said by-pass passage means for measuring the flow rate of air flowing in said by-pass passage means, wherein said outlet means of said by-pass passage means is formed annular and opened normally to the main air stream.

4. An air flow rate measuring device comprising
a suction tube for introducing air into an internal combustion engine, said suction tube having a throat portion which forms an inner shoulder inside said suction tube;
a venturi tube disposed in said suction tube so that the lower end of said venturi tube rests on said inner shoulder;
a cylinder disposed inside said suction tube so as to rest on the upper end of said venturi tube;
a by-pass passage by passing said venturi tube, an inlet of said by-pass passage being defined by the lower end of said cylinder and the upper end of said venturi tube so as to project inside the inner face of said cylinder;
an outlet of said by-pass passage being defined by the lower end of said venturi tube and said inner shoulder of said suction pipe; and means including a hot wire disposed in said by-pass passage for measuring the flow rate of air flowing in said by-pass passage.

5. The device as defined in claim 4, wherein the outside of said venturi tube is so tapered at both end portions that the diameter will reduce toward both ends thereof, and the tapered portions each form a part of said by-pass passage whereby the air flow in said by-pass passage is stable and the by-pass ratio of the air is increased.

6. The device defined in claim 4, wherein the diameter of said venturi tube at the outer top end is less than that of the inner diameter of said cylinder so that said inlet of said by-pass passage is opened against the air stream in said cylinder.

7. The device defined in claim 6, wherein said outlet of said by-pass passage is opened normal to the air stream.

8. The device as defined in claim 4, wherein the inlet of said by-pass passage forms an annular slit which opens at an angle to the main air passage through said suction tube and the upper end of said venturi tube is slightly projected into said main air passage with respect to said cylinder so that the air disposed at said slit will be subjected to the dynamic pressure of the air flowing through said main air passage.

9. The device defined in claim 8, wherein said outlet of said by-pass passage is opened normal to the air stream.

10. An air flow rate measuring device for an internal combustion engine, comprising:
main air passage means for introducing therethrough air into an internal combustion engine and having a relatively lower pressure portion at which the air stream is at a lower pressure than other portions thereof;
by-pass passage means for by-passing a portion of said air stream of said main air passage means, including outlet means communicating with the air stream at said relatively-lower pressure portion of said main air passage means so that the air at said outlet means is subjected to the static pressure of the air stream flowing in the main air passage means at this point, and inlet means disposed upstream of said outlet means and formed as an annular slit along the inner circumference of said main air passage means, a downstream of a slit defining surface projects slightly into said main air passage means such that the inlet means is open in radial and axial directions so that the air at said inlet means is subjected to the dynamic pressure due to the air stream flowing in said main air passage means; and
sensor means disposed in said by-pass passage means for measuring the flow rate of air flowing in said by-pass passage means.

11. The device as defined in claim 10, wherein said outlet means of said by-pass passage means is formed annular and opened normally to the main air stream.

12. The device as defined in claim 10, wherein the portion of said by-pass passage means disposed between said inlet means and said outlet means thereof is of non-annular configuration.

13. The device as defined in claim 12, wherein said non-annular portion of said by-pass passage means is non-coaxially arranged with respect to said main air passage means.

14. The device as defined in claim 10, wherein said slit defining surface extends at an angle to the axis of said main air passage means so that the air disposed at said slit will be subjected to the dynamic pressure of the air flowing through said main air passage.

* * * * *